United States Patent
Cooper et al.

(10) Patent No.: US 10,747,566 B2
(45) Date of Patent: Aug. 18, 2020

(54) RESTARTING APPLICATION SERVERS

(71) Applicant: International Business Machines Corporation, Armonk, NY (US)

(72) Inventors: Mark D. Cooper, Poughkeepsie, NY (US); Christopher D. Filachek, Lagrangeville, NY (US); Daniel S. Gritter, Hopewell Junction, NY (US); James D. Johnston, Jr., Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 15/819,832

(22) Filed: Nov. 21, 2017

(65) Prior Publication Data

US 2019/0155631 A1 May 23, 2019

(51) Int. Cl.
*G06F 9/455* (2018.01)
*G06F 9/4401* (2018.01)

(52) U.S. Cl.
CPC ........ *G06F 9/45558* (2013.01); *G06F 9/4401* (2013.01); *G06F 9/45533* (2013.01); *G06F 2009/4557* (2013.01); *G06F 2009/45562* (2013.01); *G06F 2009/45575* (2013.01); *G06F 2009/45579* (2013.01); *G06F 2009/45591* (2013.01); *G06F 2009/45595* (2013.01)

(58) Field of Classification Search
CPC ... G06F 8/60; G06F 8/65; G06F 21/57; G06F 21/572; G06F 21/575; G06F 21/577; G06F 9/45558; G06F 9/4401; G06F 9/45533; G06F 2009/45579; G06F 2009/4557; G06F 2009/45595; G06F 2009/45562; G06F 2009/45591; G06F 2009/45575

See application file for complete search history.

(56) References Cited

U.S. PATENT DOCUMENTS

| | | | |
|---|---|---|---|
| 6,850,953 | B1 | 2/2005 | Deshpande |
| 6,918,114 | B2 | 7/2005 | Tapperson |
| 7,516,292 | B2 | 4/2009 | Kimura |
| 8,578,379 | B2 | 11/2013 | Berg |
| 9,542,222 | B2 | 1/2017 | Mousseau |
| 2002/0174163 | A1 | 11/2002 | Tapperson |
| 2005/0240641 | A1 | 10/2005 | Kimura |

(Continued)

OTHER PUBLICATIONS

"Efficient and dynamically extensible classpath management for Java Application Servers." Original Publication Date: Dec. 1, 2000 IP.com No. IPCOM000013876D IP.com Electronic Publication Date: Jun. 18, 2003.

(Continued)

*Primary Examiner* — Wynuel S Aquino
*Assistant Examiner* — Kevin X Lu
(74) *Attorney, Agent, or Firm* — Stephen R. Yoder

(57) ABSTRACT

Application servers having multiple virtual machines are restarted by sequentially addressing each active virtual machine (VM) by adding a corresponding new VM prior to stopping the active VM before adding another new VM corresponding to another of the multiple virtual machines to be restarted. Application servers are monitored for restart conditions that trigger a sequential process of adding a new VM and stopping the corresponding active VM.

15 Claims, 3 Drawing Sheets

(56) References Cited

U.S. PATENT DOCUMENTS

| | | | | |
|---|---|---|---|---|
| 2008/0104588 A1* | 5/2008 | Barber | ............... | G06F 8/63 |
| | | | | 718/1 |
| 2010/0125844 A1 | 5/2010 | Mousseau | | |
| 2011/0047550 A1* | 2/2011 | Tachibana | ............ | G06F 9/4843 |
| | | | | 718/100 |
| 2011/0154355 A1* | 6/2011 | Becker | ............... | G06F 9/5027 |
| | | | | 718/104 |
| 2012/0137290 A1 | 5/2012 | Berg | | |
| 2014/0123142 A1* | 5/2014 | Huh | ............... | G06F 9/45533 |
| | | | | 718/1 |
| 2014/0201564 A1* | 7/2014 | Jagtiani | ............... | H04L 67/10 |
| | | | | 714/4.11 |
| 2017/0060707 A1* | 3/2017 | Harper | ............... | G06F 11/2033 |

OTHER PUBLICATIONS

"Method of graceful JVM (Java Virtual Machine) exit for multithreaded Java application" Original Publication Date: Jan. 18, 2008 IP.com No. IPCOM000166606D IP.com Electronic Publication Date: Jan. 18, 2008.

Grace Period Disclosure IBM "PJ43892: z/TPF support for Java" Last modified date Feb. 1, 2017. <http://www-01.ibm.com/support/docview.wss?uid=swg1PJ43892>.

\* cited by examiner

RESTARTING APPLICATION SERVERS

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(i) "PJ43892: z/TPF support for Java" Date publicly available: 2017 Feb. 1.

BACKGROUND

The present invention relates generally to the field of application servers, and more particularly to efficiently handling virtual machines during a server restart.

An application server is a software framework for providing facilities to create web applications and a server environment to run the applications. Application server frameworks include a comprehensive service layer model. The application server operates as a set of components that are accessible through a standard API defined for a particular platform. For Web applications, the set of components are usually accessed and performed in the same operating environment as their web server. Application servers support the construction of dynamic web pages. Many application servers target much more than just web page generation, but also implement services such as clustering, fail-over, and/or load-balancing. In that way, developers are able to focus on implementing the business logic for an application.

Java application servers behave like an extended virtual machine (VM) for running various applications while transparently handling connections to the database on one side of the process and/or connections to the web client on the other side. (Note: the term "JAVA" may be subject to trademark rights in various jurisdictions throughout the world and is used here only in reference to the products or services properly denominated by the marks to the extent that such trademark rights may exist.)

Java Platform, Enterprise Edition, or Java EE defines the core set of application programming interface (API) and features of Java Application Servers. The Java EE infrastructure is partitioned into logical containers including: (i) Enterprise JavaBeans (EJB) container; (ii) Java EE Connector Architecture (JCA) container; and (iii) Java Message Service (JMS) container. (Note: the term(s) "Enterprise Edition," "JavaBeans," "Java Message Service," "EJB," "JCA," "JMS," and/or "Java EE" may be subject to trademark rights in various jurisdictions throughout the world and are used here only in reference to the products or services properly denominated by the marks to the extent that such trademark rights may exist.)

There are various reasons that a Java application server may need to be restarted (i.e. stopped and started). For example, when a new version of the server code needs to be started, the old server code needs to be stopped.

SUMMARY

In one aspect of the present invention, a method, a computer program product, and a system includes: (i) identifying a first set of virtual machines for a recycle process; (ii) determining a first count of individual virtual machines in the first set of virtual machines; (iii) assigning a first recycle order to the first set of virtual machines; and (iv) coordinating the recycle process such that no more than one virtual machine over the first count of individual virtual machines exists during the recycle process.

In another aspect of the present invention, a method, a computer program product, and a system includes: (i) monitoring the application server process for a second restart condition during the recycle process; (ii) responsive to identifying the second restart condition, restarting the recycle process including: (a) identifying a second set of virtual machines for the recycle process; (b) determining a second count of individual virtual machines in the second set of virtual machines; (c) assigning a second recycle order to the second set of virtual machines; and (d) coordinating the recycle process such that no more than one virtual machine over the second count of individual virtual machines exists during the recycle process.

DETAILED DESCRIPTION

Figure 1:
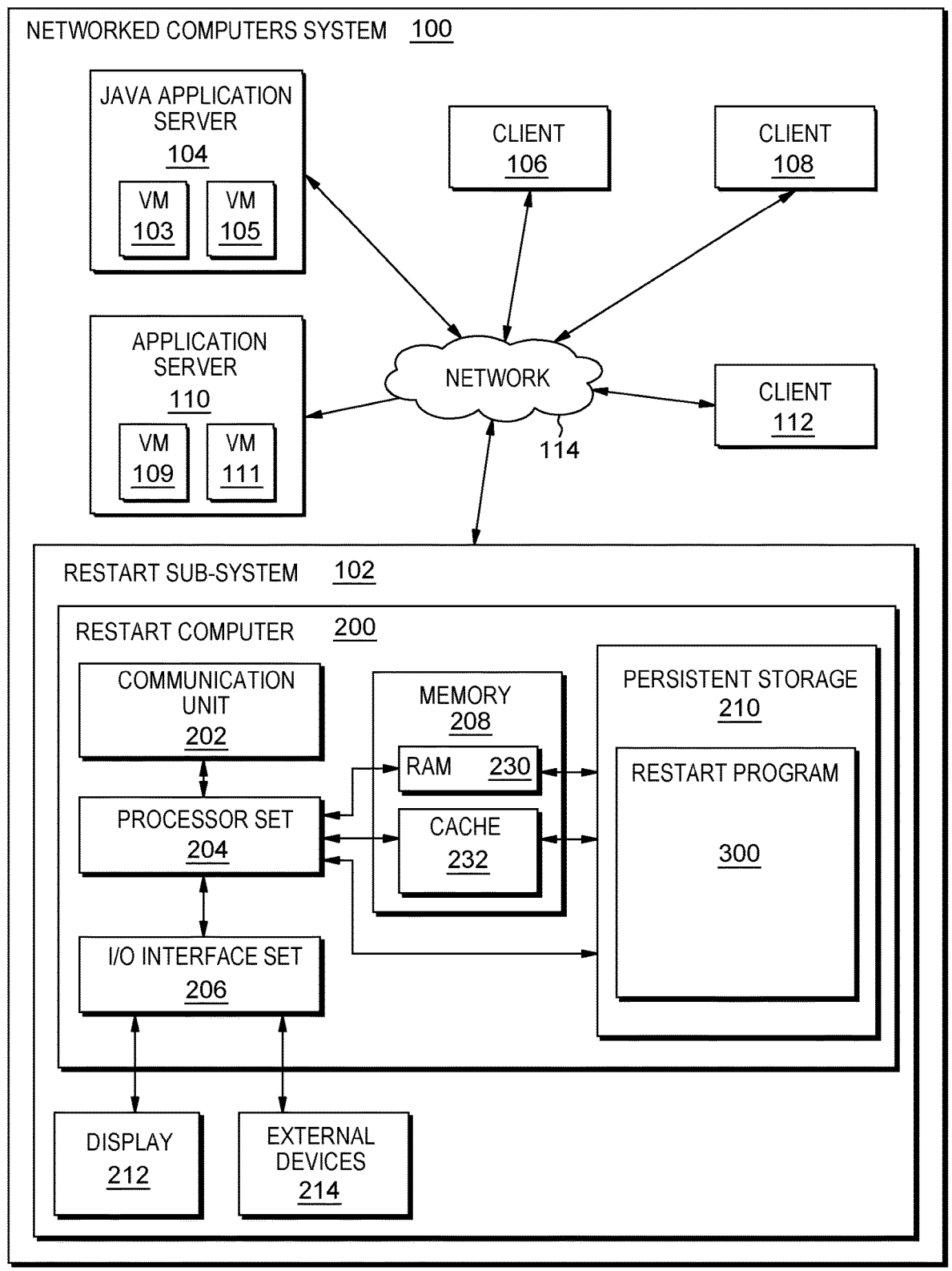
FIG. 1 is a schematic view of a first embodiment of a system according to the present invention.

Application servers having multiple virtual machines are restarted by sequentially addressing each active virtual machine (VM) by adding a corresponding new VM prior to stopping the active VM before adding another new VM corresponding to another of the multiple virtual machines to be restarted. Application servers are monitored for restart conditions that trigger a sequential process of adding a new VM and stopping the corresponding active VM. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: restart sub-system 102; JAVA application server 104; virtual machines 103, 105, 109, 111; application server 110; client sub-systems 106, 108, 112; communication network 114; restart computer 200; communication unit 202; processor set 204; input/output (I/O) interface set 206; memory device 208; persistent storage device 210; display device 212; external device set 214; random access memory (RAM) devices 230; cache memory device 232; and restart program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Restart program 300 operates to monitor a computing system, such as application server sub-system 110, for conditions indicating a restart is necessary for active virtual machines, such as VM 109 and VM 111. For each active virtual machine (VM) a new VM is started prior to shutting down a corresponding active VM. In that way, the burden on the computing system resources is minimized compared to the burden if a new VM were started for each active VM in the system at a single moment. Sequential restart is implemented by identifying active virtual machines and counting down the number of remaining virtual machines each time one of the identified active virtual machines is shut down.

Some embodiments of the present invention recognize the following facts, potential problems and/or potential areas for improvement with respect to the current state of the art: (i) manually recycling a Java server can be faulty; (ii) manually recycling a Java server can take a lot of time; (iii) client calls are often lost during the time required to manually recycle the Java server; and/or (iv) manual recycling tends to place an unnecessary burden on system resources, especially when multiple java virtual machines are involved.

When multiple Java Virtual Machines (JVMs) exist for a given Java application server where each JVM is running in a unique process, a separate process is used to detect when a recycle, or restart, is necessary. Some embodiments of the present invention detect a need to pick up new Java application code or a need to pick up new versions of system code including the JVM itself or supporting libraries such as C, C++, thread, or other libraries. Upon detecting one of the conditions for a restart, the restart commences.

Some embodiments of the present invention provide for continuous application server service while recycling the application server using minimal resources of the computing environment. By limiting the number of JVMs starting to one at a time, the system is not burdened by a spike in utilization from multiple JVMs starting up. JVMs generally place a high demand system resources, so, by having at most one additional active JVM in the computing environment at any given time during the recycling process, the demand on system resources is kept much lower than conventional recycle processes. Further, by starting a new JVM before a corresponding target JVM exits, there is no time when a JVM is not available to handle a client call, thus establishing a high availability of updated JVMs in the computing system.

Some embodiments of the present invention are directed to a method for recycling JVMs on the same physical box without any downtime in order to apply maintenance, or pick up new versions of Java applications.

Figure 2:
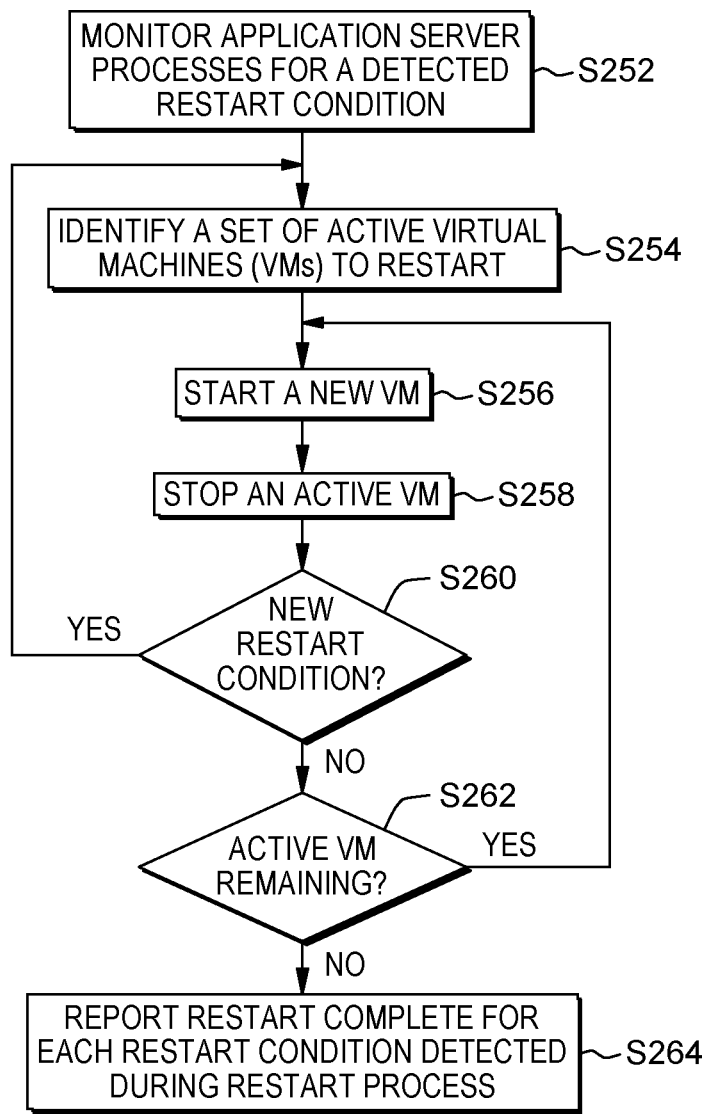
FIG. 2 is a flowchart showing a method performed, at least in part, by the first embodiment system.
Figure 3:
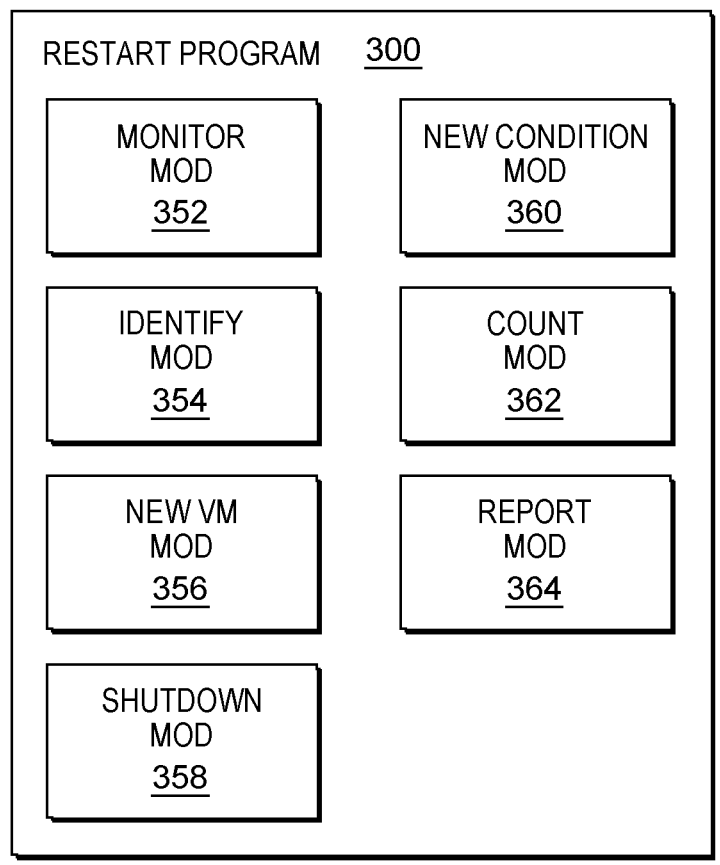
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S252, where monitor module ("mod") 352 monitors application server processes for a detected restart condition. A restart condition is any condition that is addressed at least in part by a restart of the active virtual machines (VMs). For example, when a new version of application server code is uploaded to the server, a restart condition exists. Any time that a function of the application server would likely be improved by a restart, the condition leading to the server benefiting from a restart is a "restart condition."

Processing proceeds to step S254, where identify mod 354 identifies a set of active virtual machines to restart according to an embodiment of the present invention. The set of active virtual machines includes only those virtual machines that are active in the computing system and are to be restarted according to the detected restart condition. In this example, the set of active virtual machines are all virtual machines that have not yet been stopped and are associated with an application server sub-system 110, specifically VM 109 and VM 111. Alternatively, a restart condition exists on multiple sub-systems, such as JAVA application server 104 and application server 110 and the set of active VMs is all VMs actively running on each server. Such a condition arises, for example, when server code is updated for multiple servers 104 and 110 within networked computing system 100 for which restart program 300 is responsible.

Processing proceeds to step S256, where new virtual machine (VM) mod 356 starts a new VM within a computing sub-system that includes an active VM in the set of active VMs to be restarted. For each VM of the active VM set identified in step S254, the new VM mod starts a new VM, but only one new VM at a time. The process, as stated earlier, is a sequential process that starts a single new VM and allows new calls to be handled by the new VM prior to shutting down the active VM and allowing any in-flight calls to complete. Accordingly, in this example, the new VM mod creates a new VM (not shown) and allows calls that would be sent to active VM 109 to be handled by the new VM.

Processing proceeds to step S258, where shutdown mod 358 stops the active VMs in the identified set of active VMs. As with starting a new VM by the new VM mod, shutting down each identified active VM is performed sequentially and after a corresponding new VM is started. In this example, the shutdown mod targets the identified active VM 109 for shut down. Once new VM mod 356 allows new calls to be handled by the new VM, shutdown mod allows in-flight calls to complete on the identified active VM (e.g. VM 109), and stops the identified active VM.

Processing proceeds to step S260, where new condition mod 360 checks for a new restart condition. During the restart process performed in steps S256 and S258, a new restart condition may arise. When a new restart condition arises during restart of the identified set of VMs and if the restart condition applies to at least the same VMs identified in the set of VMs, processing proceeds down the "Yes" branch, which returns to step S254 to identify a new set of VMs for processing. If no new restart condition exists or if the new restart condition does not affect each identified VM, processing proceeds down the "No" branch.

For the "No" branch, processing proceeds to step S262, where count mod 362 compares a count of VMs in the identified set of active VMs with a count of the number of active VMs shut down in step S258. If an additional VM needs to be restarted, processing follows the "Yes" branch back to step S256. If there is no additional VM to be restarted, that is, if the number of identified active VMs equals the number of VMs shut down at step S258, processing follows the "No" branch. In this example, the count mod determines a number of active VMs identified by identify mod 354 and monitors processing by shutdown mod 358 to count the number of VMs that are shut down after each set of active VMs are identified. Alternatively, identify mod 354 records to a table a number of VMs identified in the set of active VMs and shutdown mod 358 records to the table a corresponding number of VMs shut down so that the count mod refers to the table to determine if there are any remaining VMs to be shut down. Regardless of the process for tracking a target set of VMs for restart and a number of VMs actually shut down, each VM identified to be restarted is either restarted or a new condition restarts the process and a new set of target VMs is tracked during the restart process.

Proceeding down the "No" branch, processing ends at step S264, where report mod 364 reports restart completion for each restart condition detected during the restart process. As noted in the process flow, more than one restart condition may be detected before the restart process is completed. Accordingly, upon completion of a restart process, the report mod identifies each restart condition on which the completed restart is based. In this example, monitor mod 352 records the detected restart condition in a table. Each time new condition mod 360 determines that a new restart condition exists, the table is updated to include the newly identified restart condition. When process ends at step S264, the report mod refers to the table to report each restart condition that is addressed by the restart completion status.

Some embodiments of the present invention are directed to recycling a Java server having multiple active Java Virtual Machines (JVMs). According to an example method and for illustration purposes a Java application server has three active JVMs. The following process is performed on the example computing environment: (i) monitoring the Java application server periodically for a pre-defined recycle condition; (ii) detecting that the Java application server needs to be recycled according to the pre-defined recycle condition; (iii) commencing a recycle process; (iv) selecting a first active JVM from the set of three active JVMs; (v) starting a new JVM; (vi) monitoring the Java server for traffic being routed to the new JVM; (vii) on condition that traffic is detected to be routed to the new JVM, signaling to the first active JVM to exit after completing any in-flight client calls; and (viii) monitoring the Java application server for the first active JVM to exit.

The process described above is performed serially with each active virtual machine until either a new condition for restart is detected or until each active virtual machine is processed. Continuing with the above described process: (ix) on condition that the first active JVM exits, identifying a second active JVM from the two remaining active JVMs; (x) selecting the second active JVM; (xi) starting a second new JVM; (xii) monitoring the Java server for traffic being routed to the second new JVM; (xiii) on condition that traffic is detected to be routed to the second new JVM, signaling to the second active JVM to exit after completing any in-flight client calls; and (xvi) monitoring the Java server for the second active JVM to exit. Now, as stated, this process will essentially repeat through each active virtual machine one by one until all are processed or the process is interrupted by a second recycle condition. Continuing: (xvii) on condition that the second active JVM exits, identifying a third active JVM (the last remaining active JVM); (xviii) selecting the third active JVM; (v) starting a third new JVM; (vi) monitoring the Java server for traffic being routed to the third new JVM; (vii) on condition that traffic is detected to be routed to the third new JVM, signaling to the third active JVM to exit after completing any in-flight client calls; and (viii) monitoring the Java server for the third active JVM to exit.

According to the above-described process, sequential shutting down of active Java virtual machines is performed along with sequential starting up of corresponding new Java virtual machines such that for a three-JVM system, on more than four virtual machines are running at any time. In that way, the risk of loss of service is reduced compared to conventional recycle procedures and the additional workload for the computing system is lower than with conventional recycle procedures.

Some embodiments of the present invention monitor processes continually. Alternatively, monitoring is performed according to a pre-defined periodic basis (e.g every second or minute of operation, or daily regardless of a total operating time). One example of a recycle condition is any time a new version of the server code is loaded onto the computing system. For example, a new JVM may be started using a new version of the server code and when the new version of server code is detected, a recycle condition is deemed to exist. When a recycle condition is met the process described herein to update a multi-JVM computing system is initiated.

Some embodiments of the present invention additionally restart the recycle process upon detection that the Java server must be recycled again. For example, if the Java server requires a recycle after the second active JVM exits according to the process above, the process starts over with a first active JVM of the set of active JVMs regardless of the status of the last remaining JVM.

Some embodiments of the present invention may include one, or more, of the following features, characteristics and/or advantages: (i) restart application servers without loss of service; (ii) restart application servers without causing undue workload on the computing environment; and/or (iii) there is no short period of time where active virtual machines are paused during this process.

A set of Java Virtual Machines (JVMs) that exist for a Java application server. By definition, each JVM runs in a unique process. A separate process is used to detect when a recycle is necessary and commences the recycle. The method consists of picking a JVM, starting a new JVM, allowing new calls to be handled by the new JVM and then stopping the old JVM, allowing in flight calls to complete. This is done serially for every JVM to avoid many JVMs starting and stopping at the same time. The intention is to automatically recycle all the JVMs for the JAVA application avoiding an undue burden on the system utilization as well as system resources. If originally "n" JVMs were active, at most "n+1" JVMs will be active at any point during the recycle process.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
monitoring an application server process for a first restart condition;
detecting the first restart condition;
responsive to detecting the first restart condition, identifying a first set of virtual machines for a first recycle process, the first set of virtual machines being associated with the first restart condition;
determining a first count of virtual machines in the first set of virtual machines;
assigning a first recycle order to the first set of virtual machines, the first recycle order indicating a sequence in which each virtual machine of the first set of virtual machines is to be stopped during the first recycle process;
coordinating the first recycle process such that each virtual machine is stopped only after a corresponding new virtual machine is added;
monitoring the application server process for a second restart condition during the first recycle process;
incrementing a recycle count for each virtual machine stopped during the first recycle process;
responsive to identifying the second restart condition, identifying a second set of virtual machines for a second recycle process;
determining the second set of virtual machines includes the first set of virtual machines and virtual machines associated with the second restart condition;
responsive to determining the second set of virtual machines includes the first set of virtual machines, ending the first recycle process, and establishing the second recycle process including:
determining a second count of virtual machines in the second set of virtual machines;
assigning a second recycle order to the second set of virtual machines;

resetting the recycle count to a base value;
coordinating the second recycle process such that each virtual machine is stopped only after a corresponding new virtual machine is added; and
incrementing the recycle count for each virtual machine stopped during the second recycle process;
comparing the second count of virtual machines to the recycle count; and
responsive to the second count being equal to the recycle count, ending the second recycle process.

2. The method of claim 1, wherein coordinating the recycle process includes:
starting only one new virtual machine;
allowing the only one new virtual machine to handle new calls to a first virtual machine of the first set of virtual machines; and
responsive to the new calls being handled by the only one new virtual machine, allowing the first virtual machine to shut down upon completion of previously received calls.

3. The method of claim 1, wherein:
the recycle process is directed to an application server; and
the set of virtual machines are running on the application server.

4. The method of claim 1, wherein the first restart condition is new application code is available.

5. The method of claim 1, wherein the first restart condition is new version of system code is available.

6. A computer program product comprising a computer-readable storage medium having a set of instructions stored therein which, when executed by a processor, causes the processor to restart an application server by:
monitoring an application server process for a first restart condition;
detecting the first restart condition;
responsive to detecting the first restart condition, identifying a first set of virtual machines for a first recycle process, the first set of virtual machines being associated with the first restart condition;
determining a first count of virtual machines in the first set of virtual machines;
assigning a first recycle order to the first set of virtual machines, the first recycle order indicating a sequence in which each virtual machine of the first set of virtual machines is to be stopped during the first recycle process;
coordinating the first recycle process such that each virtual machine is stopped only after a corresponding new virtual machine is added;
monitoring the application server process for a second restart condition during the first recycle process;
incrementing a recycle count for each virtual machine stopped during the first recycle process;
responsive to identifying the second restart condition, identifying a second set of virtual machines for a second recycle process;
determining the second set of virtual machines includes the first set of virtual machines and virtual machines associated with the second restart condition;
responsive to determining the second set of virtual machines includes the first set of virtual machines, ending the first recycle process, and establishing the second recycle process including:
determining a second count of virtual machines in the second set of virtual machines;
assigning a second recycle order to the second set of virtual machines;
resetting the recycle count to a base value;
coordinating the second recycle process such that each virtual machine is stopped only after a corresponding new virtual machine is added; and
incrementing the recycle count for each virtual machine stopped during the second recycle process;
comparing the second count of virtual machines to the recycle count; and
responsive to the second count being equal to the recycle count, ending the recycle process.

7. The computer program product of claim 6, wherein coordinating the recycle process includes:
starting only one new virtual machine;
allowing the only one new virtual machine to handle new calls to a first virtual machine of the first set of virtual machines; and
responsive to the new calls being handled by the only one new virtual machine, allowing the first virtual machine to shut down upon completion of previously received calls.

8. The computer program product of claim 6, wherein:
the recycle process is directed to an application server; and
the set of virtual machines are running on the application server.

9. The computer program product of claim 6, wherein the first restart condition is new application code is available.

10. The computer program product of claim 6, wherein the first restart condition is new version of system code is available.

11. A computer system comprising:
a processor set; and
a computer readable storage medium;
wherein:
the processor set is structured, located, connected, and/or programmed to run program instructions stored on the computer readable storage medium; and
the program instructions, when executed by the processor set, cause the processor set to restart an application server by:
monitoring an application server process for a first restart condition;
detecting the first restart condition;
responsive to detecting the first restart condition, identifying a first set of virtual machines for a first recycle process, the first set of virtual machines being associated with the first restart condition;
determining a first count of virtual machines in the first set of virtual machines;
assigning a first recycle order to the first set of virtual machines, the first recycle order indicating a sequence in which each virtual machine of the first set of virtual machines is to be stopped during the first recycle process;
coordinating the first recycle process such that each virtual machine is stopped only after a corresponding new virtual machine is added;
monitoring the application server process for a second restart condition during the first recycle process;
incrementing a recycle count for each virtual machine stopped during the first recycle process;
responsive to identifying the second restart condition, identifying a second set of virtual machines for a second recycle process;

determining the second set of virtual machines includes the first set of virtual machines and virtual machines associated with the second restart condition;

responsive to determining the second set of virtual machines includes the first set of virtual machines, ending the first recycle process, and establishing the second recycle process including:

determining a second count of virtual machines in the second set of virtual machines;

assigning a second recycle order to the second set of virtual machines;

resetting the recycle count to a base value;

coordinating the second recycle process such that each virtual machine is stopped only after a corresponding new virtual machine is added; and incrementing the recycle count for each virtual machine stopped during the second recycle process;

comparing the second count of virtual machines to the recycle count; and responsive to the second count being equal to the recycle count, ending the second recycle process.

12. The computer system of claim 11, wherein coordinating the recycle process includes:

starting only one new virtual machine;

allowing the only one new virtual machine to handle new calls to a first virtual machine of the first set of virtual machines; and responsive to the new calls being handled by the only one new virtual machine, allowing the first virtual machine to shut down upon completion of previously received calls.

13. The computer system of claim 11, wherein:

the recycle process is directed to an application server; and the set of virtual machines are running on the application server.

14. The computer system of claim 11, wherein the first restart condition is new application code is available.

15. The computer system of claim 11, wherein the first restart condition is new version of system code is available.

* * * * *